United States Patent
Lippert et al.

(10) Patent No.: US 8,699,133 B2
(45) Date of Patent: Apr. 15, 2014

(54) SAMPLE HOLDING SYSTEM FOR A MICROSCOPE WITH MAGNETIC COUPLING

(75) Inventors: Helmut Lippert, Jena (DE); Christopher Power, Jena (DE); Christian Dietrich, Jena (DE); Benno Radt, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 925 days.

(21) Appl. No.: 12/597,144

(22) PCT Filed: Apr. 4, 2008

(86) PCT No.: PCT/EP2008/002681
§ 371 (c)(1), (2), (4) Date: Feb. 25, 2010

(87) PCT Pub. No.: WO2008/131840
PCT Pub. Date: Nov. 6, 2008

(65) Prior Publication Data
US 2010/0177381 A1    Jul. 15, 2010

(30) Foreign Application Priority Data
Apr. 26, 2007 (DE) .................. 10 2007 020 577

(51) Int. Cl.
*G02B 21/26* (2006.01)
(52) U.S. Cl.
USPC ............................ 359/394; 359/398
(58) Field of Classification Search
None
See application file for complete search history.

(56) References Cited

U.S. PATENT DOCUMENTS

| 4,188,246 | A | * | 2/1980 | Lipshaw | 156/57 |
| 4,517,253 | A | * | 5/1985 | Rose et al. | 428/620 |
| 4,563,883 | A | | 1/1986 | Sitte | |
| 5,422,718 | A | | 6/1995 | Anderson | |
| 5,680,484 | A | | 10/1997 | Kikuchi et al. | |
| 5,710,625 | A | | 1/1998 | Neumann et al. | |
| 5,818,637 | A | | 10/1998 | Hoover et al. | |
| 6,656,534 | B2 | * | 12/2003 | Kozaki | 427/430.1 |
| 7,288,229 | B2 | * | 10/2007 | Turner et al. | 422/130 |

(Continued)

FOREIGN PATENT DOCUMENTS

DE    102 57 423 A1    6/2004
DE    10 2004 014 072 A1    10/2005

(Continued)

OTHER PUBLICATIONS

English language translation of the International Preliminary Report on Patentability & Written Opinion of the International Searching Authority—Forms PCT/IB/373, PCT/ISA/237, Apr. 19, 2012.

*Primary Examiner* — Arnel C Lavarias
(74) *Attorney, Agent, or Firm* — Duane Morris LLP

(57) ABSTRACT

A sample holding system for a microscope, including a sample chamber which has an upper opening and is filled with an immersion liquid, and in which a sample embedded in a transparent embedding compound is placed in a holder. Translatory movement of the sample in relation to a detection objective of the microscope, and rotating the sample about an essentially vertical rotational axis in a plane forming an angle different from zero with the optical axis of the detection objective is included. Rotating the sample includes a rotational drive provided with a magnetic coupling or a belt drive and/or toothed wheel rotational drive arranged above the sample chamber.

3 Claims, 2 Drawing Sheets

(56) References Cited

U.S. PATENT DOCUMENTS

2002/0023900 A1* 2/2002 Mahawili .................. 219/121.43
2005/0225848 A1* 10/2005 Kirchhuebel .................. 359/368
2009/0223824 A1* 9/2009 Oouchi .................. 204/545
2010/0067104 A1* 3/2010 Lippert et al. .................. 359/391

FOREIGN PATENT DOCUMENTS

| DE | 602 06 388 T2 | 5/2006 |
| WO | WO 02/095476 A2 | 11/2002 |
| WO | WO 02/095476 A3 | 11/2002 |
| WO | WO 2004/048970 A1 | 6/2004 |

* cited by examiner

SAMPLE HOLDING SYSTEM FOR A MICROSCOPE WITH MAGNETIC COUPLING

RELATED APPLICATIONS

The present application is a U.S. National Stage application of International PCT Application No. PCT/EP2008/002681 filed on Apr. 4, 2008 which claims priority benefit of German Application No. DE 10 2007 020 577.7 filed on Apr. 26, 2007, the contents of each are incorporated by reference in their entirety.

FIELD OF THE INVENTION

The present invention relates to a sample holding system for a microscope. This sample holding system comprises a sample chamber filled with an immersion liquid, in which sample chamber a sample that is embedded in a transparent embedding medium is position positioned in a holder, with the sample chamber having an opening at the top. The sample holding system also comprises means for subjecting the sample to a translatory movement relative to a detection lens of the microscope as well as means for rotating the sample about a primarily vertical axis of rotation which is located in a plane which, with the optical axis of the detection lens, encloses an angle different from zero degrees, i.e., does not extend parallel to the optical axis, but is preferably located in a plane primarily perpendicular to the optical axis.

BACKGROUND OF THE INVENTION

The sample holding system according to the present invention can be used, in particular, in single plane illumination microscopy (SPIM) which is also known as selective plane illumination microscopy. While confocal laser scanning microscopy is used to scan the sample point by point in a plurality of planes at different depths, from which three-dimensional image data of the sample are subsequently obtained, SPIM technology is based on wide-field microscopy and allows the three-dimensional imaging of the sample based on optical slices through different planes of the sample.

The advantages of SPIM technology are, inter alia, the higher speed at which the images are captured, reduced bleaching of biological samples and a greater depth of penetration of the focus into the sample.

In SPIM technology, fluorophores that are contained in the sample or have been introduced into the sample are, as a rule, excited with laser light which is formed into a so-called light sheet or, rather, which is passed across the sample in such a manner that, in the course of the observation period, the shape of a light sheet effectively results. Using one light sheet at a time, a plane at a certain depth of the sample is illuminated. By means of this illumination, an image of the sample in this particular plane is obtained. An essential feature of this method is that the direction in which the light is detected is perpendicular to or at least at an angle different from zero relative to the plane in which the illumination takes place.

PRIOR ART

SPIM technology has been described, for example, by Stelzer et al., Optics Letter 31, p. 1477 (2006), by Stelzer et al., Science 305, p. 1007 (2004), in DE 102 57 423 A1 and in WO 2004/0530558 A1.

These publications disclose, inter alia, a sample holder which allows an optimal orientation of the sample for obtaining three-dimensional image data from different viewing directions. To this end, the sample is embedded in a gel that is formed into a circular cylinder, and this gel cylinder is placed into a sample chamber that is filled with an immersion medium, for example, water. It is important that the refractive index of the gel not differ greatly from the refractive index of the surrounding immersion liquid.

In the prior art, the gel cylinder which encloses the sample is positioned in the sample chamber in such a manner that its axis of rotation extends in the direction of the gravitational force, which, considering the deformability of the gel, has advantages when it comes to positioning the sample. This gel cylinder is positioned for image acquisition such that it can be subjected to a translatory movement and, optionally, can also be rotated about its axis of rotation.

In the prior art, the optical axis of the detection lens which collects the detection light generated by the sample is oriented approximately perpendicularly to the axis of rotation of the gel cylinder and therefore does not extend vertically, as it does in the conventional microscope configuration, but horizontally, i.e., perpendicularly to the direction of the gravitational force.

It is customary, for images that are to be acquired with high linear magnification and a large numerical aperture, to use detection lenses which are designed as immersion lenses. The immersion lenses extend through a wall of the sample chamber into the sample chamber and, to prevent leakage of the immersion medium at the point at which the lens extends through the wall, are sealed along their outer circumference against the wall of the sample chamber.

To subject the sample to a translatory and a rotary movement, two approaches can be taken. On the one hand, the surrounding optical system can be moved in a manner that involves considerably technical complexity and, on the other hand, the sample as such can be directly moved. This is accomplished in the prior art at least as far as rotation is concerned in that a drive is directly coupled to the sample holder. Thus, the drive and the sample holder are directly connected to each other through the wall of the sample chamber, which has an opening for this particular purpose. To avoid leakage problems, generally the opening at the top is used where there is no risk that the immersion liquid will leak out of the chamber. Because of the mount and the design of the drive, however, direct access via the upper opening to the sample and to the inside of the chamber is made more difficult or even prevented, and inserting and removing the sample is therefore extremely inconvenient. In addition, it is difficult to mount additional instruments to manipulate the sample, and monitoring the environment in which the sample is located, such as by temperature measurements, pH value measurements, measurements of the atmospheric composition, etc., is also extremely inconvenient.

One possibility for avoiding this problem is to have the motor mount pass through a lateral wall or through the bottom of the chamber. However, in this case, to avoid leakage of the immersion liquid from the chamber, a suitable seal must be provided. Especially in the course of protracted use, however, the risk of leakage will persist due to material wear and material fatigue.

OBJECTS OF THE INVENTION

Thus, the problem to be solved by the present invention is to make available a sample holding system by means of which the sample can be easily subjected to rotary and translatory movements, without, however, allowing a motor mount which also utilizes this access to impede access to the sample from above via the opening at the top. At the same time, the objective is to avoid leakage problems.

This problem is solved with a sample holding system of the type described above in that the means for rotating the sample comprise a rotary drive with a magnetic coupling which transmits the rotary movement through a wall of the sample chamber to the holder. This transmission of movement through a wall of the chamber implies that the movement is not transmitted through the opening at the top but, in case of a box-type chamber, for example, through a lateral wall or the bottom. This obviates the need for an opening on the side or the bottom of the sample chamber and consequently requires no subsequent sealing; in addition, access to the upper opening is not impeded. Since coupling does not take place from the top, the opening at the top is not blocked by the motor mount, and the sample remains freely accessible. No complicated mechanism is required.

To this end, the drive on the outside surface of the sample chamber comprises a magnet, and an appropriately oriented magnet is attached to the holder of the sample in the chamber. Thus, the two magnets are facing each other and are separated from each other only by the wall of the sample chamber and possibly the immersion liquid. The magnetic coupling is preferably disposed on the lower surface of the sample chamber which, for example, can have the shape of a rectangle or a cylinder. However, depending on the testing device or the shape of the sample, other types are conceivable as well. Each rotation of the motor and the drive entails a commensurate rotation of the holder to which the magnet in the sample chamber is attached. This setup makes it especially easy to change the samples manually.

In a preferred embodiment of the present invention, the means for subjecting the sample to a translatory movement comprise a translatory drive which transmits the translatory movement via the magnetic coupling to the holder. This can be implemented, for example, in that a motor block which contains the rotary drive is moved by means of a translatory drive that is disposed under the sample chamber. This movement causes the opposite magnetic pole with the holder to be moved on the other side as well. Alternatively, a single block can be used, in which case only the magnet under the sample chamber carries out the translatory or rotary movement. In this case, however, movement in the Z-direction, i.e., along the axis of rotation, is possible only to a limited extent. To this end, the translatory drive can move the entire sample chamber relative to the detection lens or the detection axis.

The problem of a sample holding system of the type described above is also solved in that means for rotating the sample comprise a rotary belt drive and/or a rotary gear drive that transmit(s) the rotary movement to the holder. The drive is disposed above the chamber, with the rotary movement being transmitted via belts and/or tooth gears through the upper opening of the chamber to the holder of the sample. The sample is attached to a cantilever, which ensures easy access to the sample. Care must be taken to ensure that the mechanical components are not in any way impaired by the liquid. Since this embodiment does not require seals, leakage problems are obviated. In contrast to the indirect embodiment with a magnetic coupling, this drive has the advantage that the sample can be even better positioned, in particular in the Z-direction, i.e., upward or downward.

In a preferred variation of this embodiment, the means for subjecting the sample to a translatory movement comprise a mechanical arm that is connected to a translatory drive, with the rotary belt drive and/or rotary gear drive and the holder being attached to the mechanical arm. This makes it possible to freely move the sample in the chamber, i.e., in all three directions, independently of the sample chamber, which, in contrast to the embodiment with the magnetic coupling, also allows considerably free motion in the Z-direction along the axis of rotation. Therefore, this drive can also be used to remove the sample from the sample chamber, for example, to change samples. The rotary drive and the translatory drive may also be integrated into a motor block, and a suitable mechanical device can then transmit the translatory movement and the rotary movement to the sample holder.

In this context, it may be useful for the means responsible for the translatory movement, both with the magnetic drive and with the gear drive, to comprise a sample stage which can be moved in all spatial directions and which carries the sample chamber. The sample chamber, for example, can be permanently mounted to the sample stage. In this case, for the sample to carry out a translatory movement, the entire sample chamber is moved while the sample in the sample chamber does not move relative to the chamber. This is of advantage for movements in the Z-direction and, in particular, in cases in which an image stack is to be acquired, since the sample is more stable when it does not have to carry out a translatory movement in the sample chamber. Vibrations that may occur during the positioning of the sample are avoided. Similarly, and with the same effect, it is also possible to move the detection lens instead of the stage. To compensate for the optical paths with respect to lighting and detection, it may be useful, depending on the numerical aperture used, to provide for adaptive optical elements. This is especially useful when a light sheet is to be generated, since this light sheet must be thinnest at the point at which it impinges on the sample.

In another embodiment of the present invention which is especially useful when air lenses are used for detection, the sample chamber has a cylindrical shape, with the sample in the holder being stationarily positioned relative to the sample chamber. The sample chamber is mounted on a sample stage which can be moved in all spatial directions, with the means allowing a rotary movement comprising a rotary drive which rotates the sample chamber on the sample table about the axis of rotation of the rotary chamber. Thus, the holder with the sample is positioned in the center of the cylinder. In this manner, a rotary movement is implemented by moving the chamber as a whole, without regard to the geometry of the chamber. Sample chambers having different shapes, for example, rectangular or cubic sample chambers, can also be rotatably mounted; however, in such a case, the range of possible angles of rotation will be limited, and adaptive optical elements will preferably be used to compensate for differences in the optical paths at different angles of rotation. Other polygonal shapes can be used for the sample chamber as well.

The sample holding system according to the present invention is especially in a microscope [sic] with light sheet illumination in a plane which, with the axis of rotation and the optical axis of the detection lens, encloses an angle different from zero, preferably for use in a single plane illumination microscope (SPIM) in which the angles in an especially preferred embodiment each measure 90°.

BRIEF DESCRIPTION OF THE DRAWINGS

The invention will be explained in greater detail below by reference to practical examples. As can be seen in the appended drawings.

DESCRIPTION OF THE EMBODIMENTS

Figure 1:
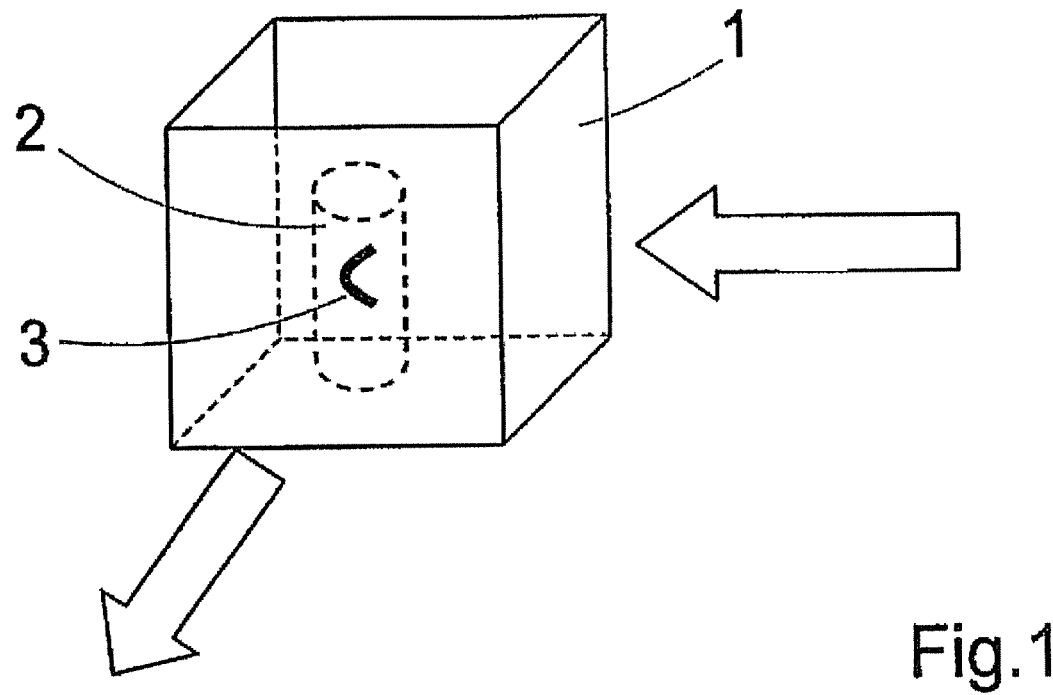
FIG. 1 shows the general setup of a sample holding system with the optical paths in a SPIM.

FIG. 1 illustrates the general setup of a sample chamber (1). The sample chamber 1 is filled with an immersion liquid and has an opening at the top, access to which is not in any way blocked, for example, by a motor mount. Contained in the sample chamber 1 is a sample 3 that is embedded in a transparent embedding medium, for example, a gel cylinder 2. Sample 3 is positioned in or on a holder (not shown in this figure). The gel cylinder 2 is able to rotate about its axis of symmetry. Because of the freely accessible opening at the top of the sample chamber 1, a user can easily access the chamber, the sample 3 can be easily changed, and the properties of the immersion liquid can be easily influenced as well, for example, by adding additives that change the pH value. The arrow on the right pointing at the figure indicates the direction from which the sample 3 is illuminated with a light sheet. The axis of rotation of the gel cylinder 2 is preferably in the plane that generates the light sheet in the focus. Detection, which is indicated by the other arrow pointing out of the plane of the page, takes place perpendicular to the direction of illumination. In addition, a sample holder that is part of the sample chamber 1 also comprises means for subjecting the sample 3 to a translatory movement relative to a detection lens as well as means for rotating the sample 3 about the axis of rotation of the gel cylinder 2.

Figure 2:
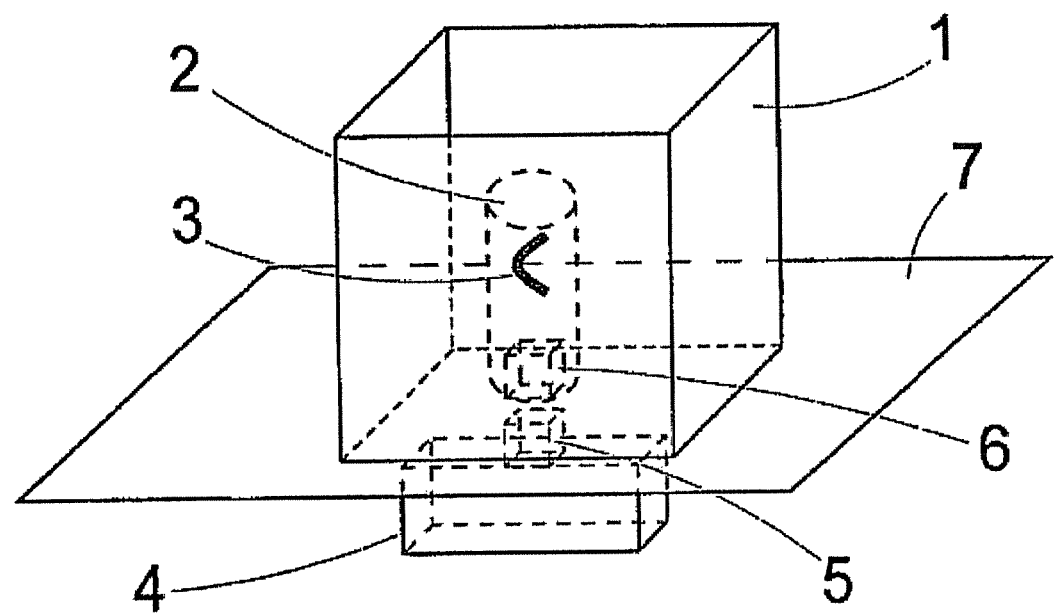
FIG. 2 shows a drive using a magnetic coupling.

FIG. 2 shows a sample holding system in which the means for rotating the sample 3 comprise a rotary drive 4 which with a magnetic coupling that transmits the rotary movement through a wall of the sample chamber 1, in this figure the bottom surface, to the holder. Also shown is a rotary drive 4 with a magnet 5, which rotary drive is located underneath the sample chamber 1. The rotary drive 4 comprises a motor which generates the rotary movement and transmits it to the magnet 5.

By rotating the magnet 5, an oppositely-poled magnet 6 in the sample chamber 1, to which magnet the holder (not shown) for the gel cylinder 2 is attached, is also made to rotate so that the holder rotates with the sample 3. The magnet 6 can also be directly incorporated into the gel cylinder 2. The sample chamber 1 is positioned on a sample stage 7. The sample 3 can be moved in the three spatial directions, for example, by moving the sample stage 7 with the sample chamber and the rotary drive 4. Alternatively or additionally, the sample stage 7 can have a cutout at the point at which the sample chamber 1 is positioned or mounted, thus allowing the rotary drive 4 to be moved by means of a translatory drive (not shown) in the area of the lower surface of the sample chamber 1, which moves the sample by means of the magnetic coupling in the plane of the sample stage. The rotary drive 4 and the translatory drive can also be integrated into a shared unit so that only the magnet 5 is moved.

Figure 3:
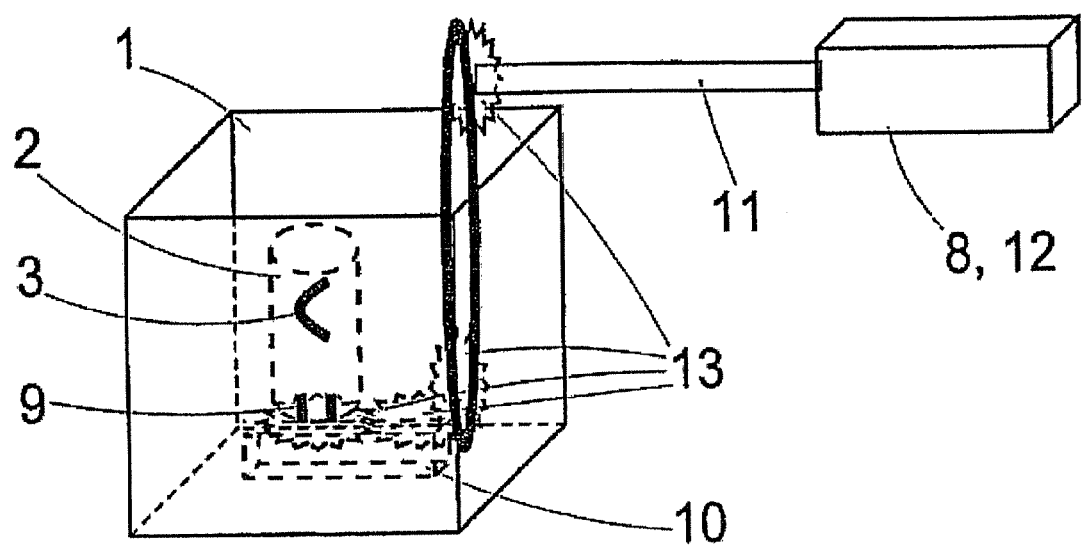
FIG. 3 shows a drive using a mechanical arm.

In the sample holding system shown in FIG. 3, the means for rotating the sample 3 comprise a rotary belt and/or rotary gear drive 8 which are/is disposed above the sample chamber 1 and which transmit(s) the rotary movement to a holder 9. The holder 9 is mounted on a cantilever 10 of a mechanical arm 11. The rotary belt and/or rotary gear drive 8 and the holder 9 are mounted on this mechanical arm 11 with its cantilever 10. In addition, the mechanical arm 11 is connected to a translatory drive 12. In the example at hand, the rotary movement is transmitted via gear teeth 13 to the holder 9. Matching gear teeth are therefore also disposed on the holder 9. As an alternative, a belt drive can be used. In this manner, the entire sample arm [sic] with the sample 3 can be moved in the sample chamber 1 independently of this chamber. This makes it possible, for example, to maintain a constant optical path length. The mechanical arm 11 and its drives 8 and 12 can be designed so that it can be placed on the bottom of the sample chamber 1, thereby making it possible to suppress the development of vibrations as much as possible when only the sample 3 is rotated. Again, the sample chamber 1 can be disposed on an additional movable sample stage.

Figure 4:
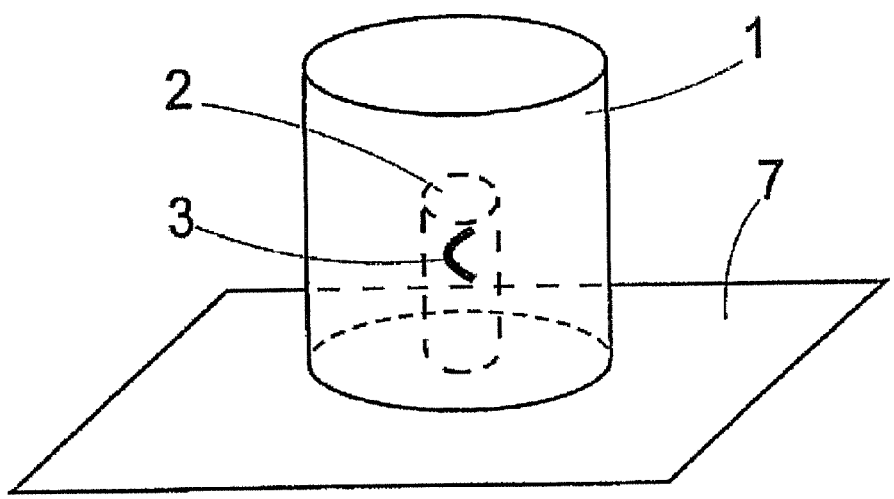
FIG. 4 shows a drive moving the sample stage and having a cylindrical sample chamber.

Lastly, FIG. 4 shows a cylindrical sample chamber 1 which is disposed or mounted on a sample stage 7 that can move in all three spatial directions. In this case, the sample 3 is rotated by rotating the entire sample chamber 1 with the sample 3; to this end, a suitable rotary drive is provided. The chamber 1 need not necessarily have the shape of a cylinder; other shapes are conceivable as well, for example, shapes with a polygonal cross section. However, the cylindrical shape has the advantage that during illumination and detection, the geometric beam ratios do not change when the sample chamber is rotated. By not moving the sample 3 as such in the chamber 1 but instead the chamber 1 and the stage 7, the overall stability of the sample 3 can be increased. In particular, it is possible to avoid vibrations that are generated while the position of the sample 3 is being changed.

LIST OF REFERENCE NUMERALS

1 Sample chamber
2 Gel cylinder
3 Sample
4 Rotary drive
5, 6 Magnet
7 Sample stage
8 Rotary drives
9 Holder
10 Cantilever
11 Arm
12 Translatory drive
13 Gear wheel While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A sample holding system for a microscope, comprising
a sample chamber having a top, said chamber filled with an immersion liquid, in which chamber a sample embedded in a transparent embedding medium is positioned in a holder, said sample chamber having an opening at the top,
means for subjecting the sample to a translatory movement relative to a detection lens of the microscope, said detection lens having an optical axis, and
means for rotating the sample about a primarily vertical axis of rotation which is located in a plane that encloses an angle different from zero with the optical axis of the detection lens, said means for rotating the sample comprising a rotary drive with a magnetic coupling which transmits rotary movement to the holder through a lower surface of the sample chamber.

2. The sample holding system of claim 1, wherein the translatory movement means comprises a translatory drive which transmits the translatory movement via the magnetic coupling to the holder.

3. The sample holding system according to claim 1 for use in a microscope with light sheet illumination in a plane which, with the axis of rotation and the optical axis of the detection lens, encloses an angle different from zero, for use in a single plane illumination microscope.

* * * * *

UNITED STATES PATENT AND TRADEMARK OFFICE
CERTIFICATE OF CORRECTION

| | | |
|---|---|---|
| PATENT NO. | : 8,699,133 B2 | Page 1 of 1 |
| APPLICATION NO. | : 12/597144 | |
| DATED | : April 15, 2014 | |
| INVENTOR(S) | : Helmut Lippert et al. | |

It is certified that error appears in the above-identified patent and that said Letters Patent is hereby corrected as shown below:

In the Specification

Column 1, line 20: now reads: "embedding medium is position positioned in a holder, with"
should read --embedding medium is positioned in a holder with--.

Signed and Sealed this
Seventeenth Day of February, 2015

Michelle K. Lee
*Deputy Director of the United States Patent and Trademark Office*